US008940419B2

United States Patent
Mukai

(10) Patent No.: US 8,940,419 B2
(45) Date of Patent: Jan. 27, 2015

(54) METHOD FOR PRODUCTION OF HARD DISK SUBSTRATE AND HARD DISK SUBSTRATE

(75) Inventor: Nobuaki Mukai, Yamaguchi (JP)

(73) Assignee: Toyo Kohan Co., Ltd., Tokyo (JP)

( * ) Notice: Subject to any disclaimer, the term of this patent is extended or adjusted under 35 U.S.C. 154(b) by 0 days.

(21) Appl. No.: 13/878,019

(22) PCT Filed: Oct. 4, 2011

(86) PCT No.: PCT/JP2011/072830
§ 371 (c)(1),
(2), (4) Date: Apr. 5, 2013

(87) PCT Pub. No.: WO2012/046712
PCT Pub. Date: Apr. 12, 2012

(65) Prior Publication Data
US 2013/0196178 A1    Aug. 1, 2013

(30) Foreign Application Priority Data

Oct. 7, 2010   (JP) .................... 2010-227205

(51) Int. Cl.
*G11B 5/84*       (2006.01)
*C23C 20/00*      (2006.01)
(Continued)

(52) U.S. Cl.
CPC .......... *G11B 5/8404* (2013.01); *C23C 18/1651* (2013.01); *C23C 18/36* (2013.01); *G11B 5/858* (2013.01); *C23C 18/1844* (2013.01)
USPC ........ 428/846.2; 427/130; 427/131; 106/1.22

(58) Field of Classification Search
CPC  C23C 18/36; C23C 18/1844; C23C 18/1651; G11B 5/858; G11B 5/8404
USPC ........... 205/89, 118, 170, 176, 134, 205, 258; 204/194; 427/129, 132, 127, 130, 131; 106/1.22; 428/848.8, 846, 800, 846.2, 428/847.1
See application file for complete search history.

(56) References Cited

U.S. PATENT DOCUMENTS

2004/0031694 A1\*  2/2004  Feng .......................... 205/258
2005/0249984 A1   11/2005  Ohmori et al.
(Continued)

FOREIGN PATENT DOCUMENTS

JP    62-128020 A    6/1987
JP    62-291726      12/1987
(Continued)

OTHER PUBLICATIONS

Translation Fuji (JP 2011-134419), Jul. 2007.\*
(Continued)

*Primary Examiner* — Kevin M. Bernatz
*Assistant Examiner* — Louis Falasco
(74) *Attorney, Agent, or Firm* — McCarter & English

(57) ABSTRACT

Provided are a method for production of a hard disk substrate capable of obtaining a smooth surface of a plating film by electroless NiP plating that is not degraded in, but exhibits corrosion resistance against, an acid solution and such a hard disk substrate. The method for production of a hard disk substrate including an electroless NiP plating film, includes the steps of: a first plating step of immersing a substrate in first electroless NiP plating bath containing an additive having a smoothing effect to form a lower layer of the electroless NiP plating film on a surface of the substrate, the lower layer having an average surface roughness smaller than an average surface roughness of the surface; and a second plating step of immersing the substrate on which the lower layer of the electroless NiP plating film is formed in the first plating step in a second electroless NiP plating bath to form an upper layer of the electroless NiP plating film, the upper layer having corrosion resistance against an acid solution. The resulting plating film has a smooth surface that is not degraded in, but exhibits corrosion resistance against, an acid solution.

8 Claims, 3 Drawing Sheets

(51) Int. Cl.
  *C23C 18/00* (2006.01)
  *C23C 18/16* (2006.01)
  *C23C 18/36* (2006.01)
  *G11B 5/858* (2006.01)
  *C23C 18/18* (2006.01)

(56) References Cited

U.S. PATENT DOCUMENTS

| | | |
|---|---|---|
| 2006/0289311 A1* | 12/2006 | Brink et al. ............... 205/118 |
| 2009/0029190 A1 | 1/2009 | Ohmori et al. |
| 2009/0050486 A1* | 2/2009 | Flotta et al. .............. 205/89 |
| 2011/0056839 A1* | 3/2011 | Medina et al. ............ 205/176 |
| 2012/0058259 A1* | 3/2012 | Nye et al. ................. 427/129 |

FOREIGN PATENT DOCUMENTS

| | | |
|---|---|---|
| JP | 02-190484 | 7/1990 |
| JP | 04-291018 | 10/1992 |
| JP | 2004-335068 | 11/2004 |
| JP | 2007-332435 A | 12/2007 |
| JP | 2011-134419 A | 7/2011 |
| WO | WO-2012/046712 A1 | 4/2012 |

OTHER PUBLICATIONS

PCT/JP2013/060093 International Search Report, published May 14, 2013 (English translation not available).
PCT/JP2013/060096 International Search Report, published May 28, 2013 (English translation not available).

* cited by examiner

Fig. 1

| | | Ex. | Comp. Ex. 1 | Comp. Ex. 2 |
|---|---|---|---|---|
| Surface roughness after plating | Surface roughness Ra | 2.6 (nm) | 14.8 (nm) | 2.1 (nm) |
| corrosion resistance against the acid solution | Number of corrosion pits | 1250 (pieces/mm²) | 1125 (pieces/mm²) | 72875 (pieces/mm²) |

20μm

METHOD FOR PRODUCTION OF HARD DISK SUBSTRATE AND HARD DISK SUBSTRATE

CROSS REFERENCE TO RELATED APPLICATIONS

This application is a national stage application filed under 35 USC 371 of PCT/JP2011/072830, filed Oct. 4, 2011, which claims the benefit of Japanese Patent Application No. 2010-227205, filed Oct. 7, 2010, all of which are incorporated herein by reference in their entirety.

FIELD OF THE INVENTION

The present invention relates to a method for production of a hard disk substrate as well as a hard disk substrate.

BACKGROUND OF THE INVENTION

Hard disk substrates are manufactured by a method including electroless NiP plating applied to a machined aluminum or aluminum alloy substrate to form a plating film as a base of a magnetic film (see Patent Document 1).

Herein, for higher-density recording by hard disk devices, it is required to minimize the floating height of a recording/reproducing head from the surface of a hard disk substrate. To this end, following the formation of a plating film by electroless NiP plating, polishing is performed to smooth the surface of the plating film using free abrasive grains.

Patent Document 1: JP Patent Publication (Kokai) No. 03-236476 A (1991)

Since the surface of the plating film by electroless NiP plating is very rough, heave burden is imposed on the polishing process. Further, since the removal thickness with polishing is large, the plating film also has to be made thick. Therefore, productivity deteriorates and environmental burden increases.

From such a viewpoint, it has been desired to smooth the surface of a plating film formed by electroless NiP plating as flat as possible to reduce the burden on the polishing process. For instance, when a plating film is formed on a printed board or the like, a brighter such as an organic sulfur compound is added to electroless plating bath, thus forming a plating film having a smooth surface.

In general, however, a plating film containing sulfur has poor corrosion resistance against the acid solution, and especially during the manufacturing process for hard disk substrates using strong-acid slurry in the polishing step, defects such as corrosion pits may occur on the surface of the plating film, and therefore techniques of printed boards cannot be applied directly. Further, such poor corrosion resistance against the acid solution of the plating film may cause excessive elution of Ni preferentially from the plating film during washing with strong acid, which may lead to problems in the subsequent steps for the hard disk substrates.

In view of the above issues, it is an object of the invention to provide a method for production of a hard disk substrate capable of obtaining a smooth surface of a plating film by electroless NiP plating that is not degraded in corrosion resistance against the acid solution and such a hard disk substrate.

SUMMARY OF THE INVENTION

In order to cope with the aforementioned problems, a method for production of a hard disk substrate of the present invention is to produce a hard disk substrate including an electroless NiP plating film, and the method for production includes the steps of: a first plating step of immersing a substrate in first electroless NiP plating bath containing an additive having a smoothing effect to form a lower layer of the electroless NiP plating film on a surface of the substrate, the lower layer having average surface roughness smaller than an average surface roughness of the surface; and a second plating step of immersing the substrate on which the lower layer of the electroless NiP plating film is formed in the first plating step in second electroless NiP plating bath to form an upper layer of the electroless NiP plating film, the upper layer having corrosion resistance against the acid solution.

Preferably, the additive includes an organic sulfur compound. Then, the second electroless NiP plating bath does not include an organic sulfur compound added thereto. Preferably, the organic sulfur compound includes at least one of thiourea, sodium thiosulfate, sulfonate, an isothiazolone compound, sodium lauryl sulfate, 2,2'-dipyridyl disulfide, 2,2'-dithiodibenzoic acid and bisdisulfide. Preferably, the organic sulfur compound includes nitrogen. Preferably, a contained amount of the organic sulfur compound is 0.01 ppm or more and 20 ppm or less, and particularly preferably a contained amount of the organic sulfur compound is 0.1 ppm or more and 5 ppm or less.

According to the method for production of a hard disk substrate of the present invention, a plating film having a smooth surface can be obtained, and corrosion resistance against the acid solution thereof is not degraded. Therefore, burden on the polishing step can be reduced, and the productivity of hard disk substrates can be improved. Further, waste fluid discharged from the polishing step can be reduced, the removal thickness with polishing can be made smaller and the film thickness of the plating film also can be made thinner, so that environmental burden can be reduced as well.

BRIEF DESCRIPTION OF THE DRAWINGS

FIG. 1 shows measurement results of Example 1 and Comparative Examples 1 and 2.

DETAILED DESCRIPTION OF THE INVENTION

Figure 2:
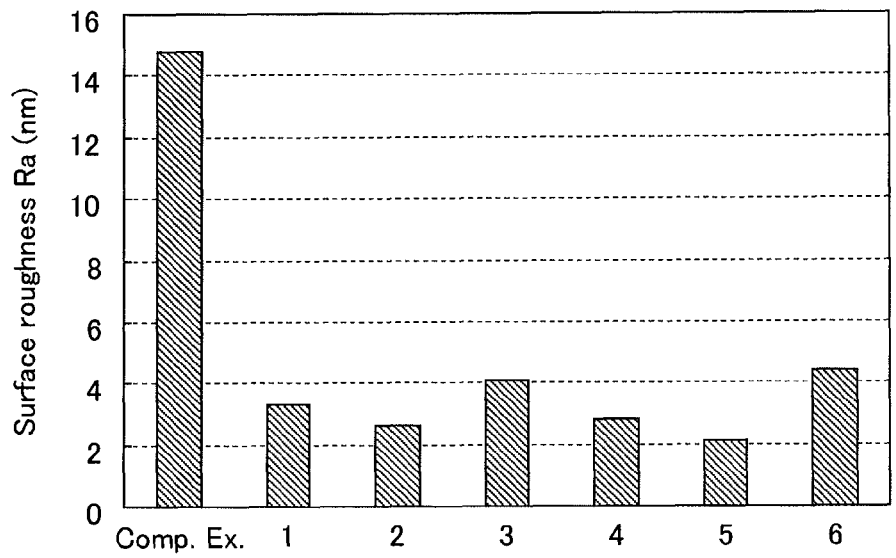
FIG. 2 shows a measurement result of Example 2.

The following describes the present embodiment in detail.

A method for production of a hard disk substrate in the present embodiment includes: a substrate formation step of grinding aluminum alloy blank to form a substrate; a plating step of performing electroless NiP plating to the substrate to form an electroless NiP plating film on a surface of the substrate; a polishing step of polishing the surface of the substrate on which the electroless NiP plating film is formed; and a washing step of washing the polished plating film.

Among these steps, the plating step can be performed with (1) degreasing treatment, (2) water-washing, (3) etching treatment, (4) water-washing, (5) desmutting treatment, (6) water-washing, (7) first zincate treatment, (8) water-washing, (9) de-zincate treatment, (10) water-washing, (11) second zincate treatment, (12) water-washing, (13) electroless NiP plating, (14) water-washing, (15) drying and (16) baking, where the (13) electroless NiP plating can be performed with two stages of a first plating step and a second plating step.

In the first plating step, the substrate is immersed in first electroless NiP plating bath containing an additive having a smoothing effect to form a lower layer of the electroless NiP plating film on the surface of the substrate. Through this treatment, the electroless NiP plating film formed will have average surface roughness smaller than the average surface roughness of the aluminum alloy blank. As the additive having a smoothing effect, an organic sulfur compound may be used.

Presumably, this additive having a smoothing effect is deposited at protrusion parts of the aluminum alloy blank having irregularities, so that the growth of electroless NiP plating is delayed at these parts than at other parts so as to reduce an influence of the irregularities of the alumina alloy blank, and thereby a smooth plating film can be obtained.

Then, the process shifts to the second plating step, where the substrate on which the lower layer of the electroless NiP plating film is formed by the first plating step is immersed in second electroless NiP plating bath having corrosion resistance against the acid solution so as to form an upper layer of the electroless NiP plating film. In order to form the electroless NiP plating film having corrosion resistance against the acid solution, plating bath to which an organic sulfur compound is not added can be used.

Corrosion resistance against the acid solution referred to herein may be in a degree of corrosion resistance against the acid solution of a conventionally available electroless NiP plating film. To this end, it is preferable not to add an organic sulfur compound to plating bath positively, but the mixture thereof is permitted in the degree of contamination not affecting the corrosion resistance against the acid solution.

For the first and the second electroless NiP plating bath, water-soluble nickel salt is used as a supply source of nickel ions. Exemplary water-soluble nickel salt includes nickel sulfate, nickel chloride, nickel carbonate, nickel acetate or nickel sulfamate. Preferably, the density in the plating bath is 1 g/L or more and 30 g/L or less as metallic nickel.

As a complexing agent, among dicarboxylic acid and alkali salt thereof such as tartaric acid, malic acid, citric acid, succinic acid, malonic acid, glycolic acid, gluconic acid, oxalic acid, phthalic acid, fumaric acid, maleic acid, lactic acid and sodium salt, potassic salt and ammonium salt thereof, two types or more may be used, at least one of which is preferably oxy-dicarboxylic acid. Preferably, the density of the complexing agent is 0.01 mol/L or more and 2.0 mol/L or less.

As a reducing agent, hypophosphoric acid or hypophosphite such as sodium hypophosphite or potassium hypophosphite is preferably used. Preferably, the density of the reducing agent is 5 g/L or more and 80 g/L or less.

In the first plating step, in order to smooth the surface of an electroless NiP plating film as a lower layer, the first electroless NiP plating bath to which a brighter such as an organic sulfur compound is added is preferably used as an additive having a smoothing effect for electroless NiP plating.

The organic sulfur compound may contain a sulfur atom in the structural formula, and for example, thiourea, sodium thiosulfate, sulfonate, an isothiazolone compound, sodium lauryl sulfate, 2,2'-dipyridyl disulfide, 2,2'-dithiodibenzoic acid and bisdisulfide may be used. One of them may be used alone or two types or more may be used together. More preferably, the organic sulfur compound contains nitrogen, including thiourea, isothiazolone compounds, 2,2'-dipyridyl disulfide and bisdisulfide. The amount of the organic sulfur compound added may be 0.01 ppm or more and 20 ppm or less, and especially preferably 0.1 ppm or more and 5 ppm or less. From a too small amount of it, the smoothing effect of the plating film cannot be obtained, and from a too large amount, more effect cannot be expected.

Such a brighter as the organic sulfur compound has toxicity lower than that of a brighter containing Cd, As, Tl or the like, and so is suitable for actual usage in many cases.

The first electroless NiP plating bath preferably contains a pH adjuster such as acid, alkali or salt, a preservative agent to prevent mold generation in the plating bath during storage, a buffer to suppress a variation of pH, a surface activating agent to suppress pinholes, and a stabilizer to suppress degradation of the plating bath.

In the second plating step, electroless NiP plating is preferably performed using second electroless NiP plating bath that does not contain an organic sulfur compound. The second electroless NiP plating bath may be one typically used for manufacturing of a hard disk substrate, and has corrosion resistance against the acid solution in the polishing step after the plating step and in the subsequent washing step on the electroless NiP plating film.

According to the aforementioned manufacturing method for a hard disk substrate, a substrate is immersed in the first electroless NiP plating bath containing an additive having a smoothing effect such as an organic sulfur compound to form a lower layer of an electroless NiP plating film on the surface of the substrate, whereby the surface roughness of the lower layer can be decreased and the surface of the lower layer can be smoothed.

Then, the substrate on which the lower layer of the electroless NiP plating film is formed is immersed in the second electroless NiP plating bath having corrosion resistance against the acid solution so as to form an upper layer of the electroless NiP plating film on the surface of the smoothed lower layer, whereby the surface roughness of the upper layer can be decreased and the surface of the upper layer can be smoothed. Then, since the upper layer having corrosion resistance against the acid solution covers the surface of the lower layer, corrosion resistance against the acid solution is not degraded in the polishing step and the washing step.

Accordingly, burden on the polishing step can be reduced, and the productivity of hard disk substrates can be improved. Further, waste fluid discharged from the polishing step can be reduced, the removal thickness with polishing can be made smaller and the film thickness of the plating film also can be made thinner, so that environmental burden can be reduced as well.

EXAMPLES

The following describes Examples and Comparative Examples for detailed descriptions of the present invention, but the present invention is not limited to the following examples.

<Pretreatment Step>

A commercially-available 3.5-inch aluminum substrate of average surface roughness Ra=15 nm as a substrate was degrease-treated using well-known degreasing liquid including sodium phosphate and a surface activating agent at 50° C. for 2 minutes, followed by etching using well-known etchant including sulfuric acid and phosphoric acid at 70° C. for 2 minutes.

Then, the substrate was desmutting-treated using nitric acid at 20° C. for 30 seconds, and was $1^{St}$-zincate treated at 20° C. for 30 seconds using well-known zincate treatment liquid. Subsequently, de-zincate treatment was performed using nitric acid at 20° C. for 30 seconds, followed by 2nd zincate treatment at 20° C. for 30 seconds.

<Plating Conditions>

Example 1

In the first plating step to form a lower layer on the surface of the above-mentioned substrate, well-known malic acid—succinic acid electroless NiP plating bath to which 1 ppm of 2,2'-dipyridyl disulfide was added as an organic sulfur compound was used for plating treatment at 85° C. for 90 minutes, thus obtaining a plating film thickness of 10 µm. The surface roughness of the electroless NiP plating film was measured using an atomic force microscope (AFM) manufactured by Veeco corp. (the roughness is represented as average roughness Ra of 10 µm square). As a result, the value of the surface roughness was 2.3 nm.

Then, in the second plating step to form an upper layer after the surface of the lower layer of the electroless NiP plating film was washed, well-known malic acid—succinic acid electroless NiP plating bath to which no organic sulfur compound was added was used for plating treatment at 85° C. for 20 minutes, thus obtaining a plating film thickness of 2 µm, so that the plating film thickness in total on the surface of the substrate was 12 µm.

Comparative Example 1

The aforementioned well-known malic acid—succinic acid electroless NiP plating bath to which no organic sulfur compound was added was used for plating treatment at 85° C. for 120 minutes, thus obtaining a plating film thickness of 12 µm. That is, the plating treatment was performed using electroless NiP plating bath not including an organic sulfur compound and having corrosion resistance against the acid solution.

Comparative Example 2

The aforementioned well-known malic-acid—succinic acid electroless NiP plating bath to which 1 ppm of organic sulfur compound was added was used for plating treatment at 85° C. for 120 minutes, thus forming a plating film thickness of 12 µm. That is, the plating treatment was performed using electroless NiP plating bath including an organic sulfur compound.

(Measurement Results)

The surface roughness of the electroless NiP plating films of Example 1 and Comparative Examples 1 and 2 was measured using an atomic force microscope (AFM) manufactured by Veeco corp. (the roughness is represented as average roughness Ra of 10 µm square).

Further for visual check, the surface of the plating films was photographed by an optical microscope. As for corrosion resistance against the acid solution, after the electroless NiP plating films of Example 1 and Comparative Examples 1 and 2 were immersed in nitric acid (density 30%, temperature 40° C.) for 5 minutes, the surfaces of the films were photographed by an optical microscope and the number of corrosion pits in the field of view was counted for measurement.

FIG. 1 shows measurement results of Example 1 and Comparative Examples 1 and 2.

In Example 1, the surface roughness Ra after plating was 2.6 nm, and the number of corrosion pits was 1,250 (pieces/mm$^2$). In Comparative Example 1, the surface roughness Ra after plating was 14.8 nm, and the number of corrosion pits was 1,125 (pieces/mm$^2$). In Comparative Example 2, the surface roughness Ra after plating was 2.1 nm, and the number of corrosion pits was 72,875 (pieces/mm$^2$).

In the case of Comparative Example 1, since the electroless NiP plating bath having corrosion resistance against the acid solution was used for plating, the number of corrosion pits was less than that of Example 1. However, since no organic sulfur compound was contained, the surface roughness Ra became larger (rougher) than that of Example 1, and a plurality of minute irregularities were observed on the surface of the plating film in FIG. 1. Therefore, in the case of Comparative Example 1, heavy burden will be expected in the polishing step.

Then, in the case of Comparative Example 2, since the electroless NiP plating bath including an organic sulfur compound was used for plating, the surface roughness Ra was smaller than that of Example 1, and no irregularities were observed on the surface in FIG. 1. However, the number of corrosion pits was extremely larger than that of Example 1, and it was found that the film had poor corrosion resistance against the acid solution. Therefore, defects such as corrosion pits will be expected in the polishing step, and excessive elution of Ni from the NiP plating film will be expected during the washing step, which may adversely affect the subsequent steps for the hard disk substrate.

Compared with these Comparative Examples 1 and 2, Example 1 had small and smooth surface roughness Ra after plating, and had a small number of corrosion pits, and therefore it can be found that the film has excellent corrosion resistance against the acid solution.

Example 2

A plurality of types of organic sulfur compounds were prepared and plating treatment was performed under the same plating conditions as those of Example 1 to manufacture samples with sample numbers 1 to 6. The following Table 1 shows the names of organic sulfur compounds added, the structural formulas thereof and the amounts of addition.

TABLE 1

| Sample No. | Additive Name | Structural formula | Additive amount (ppm) |
|---|---|---|---|
| 1 | Sodium thiosulfate | $Na_2S_2O_2$ | 0.75 |
| 2 | Thiourea | $CS(NH_2)_2$ | 1 |
| 3 | Sodium lauryl sulfate | $C_{12}H_{25}SO_3Na$ | 2 |
| 4 | Isothiazolone compound | $C_4H_4NSClO$ | 0.75 |
| 5 | 2,2'-dipyridyl disulfide | $C_{10}H_{18}N_2S_2$ | 1 |
| 6 | Naphthalenesulfonate condensate | $(C_{10}H_4SO_3Na)_n$ | 200 |

Then, similarly to Embodiment 1, surface roughness of the electroless NiP plating films was measured using an atomic force microscope (AFM) manufactured by Veeco corp. (the roughness is represented as average roughness Ra of 10 µm square).

FIG. 2 shows measurement results of surface roughness of these samples and Comparative Example.

The Comparative Example in FIG. 2 is the aforementioned Comparative Example 1. Since this Comparative Example does not include an organic sulfur compound added thereto, the surface roughness (Ra) thereof was large (14.8 nm), and it can be found that the surface thereof was rougher than the samples with sample numbers 1 to 6. On the other hand, the present examples, i.e., the samples with sample numbers 1 to 6 including organic sulfur compounds added thereto had smaller surface roughness (Ra) and it can be found that the surfaces thereof were smoother than Comparative Example. Among them, the samples with sample numbers 2, 4 and 5 had small surface roughness (Ra) and showed a prominent smoothing effect. It is expected that nitrogen contained in the organic sulfur compounds influences on the effect.

Example 3

Using the organic sulfur compounds having particularly excellent smoothing effect in the above Example 2, i.e., 2,2'-dipyridyl disulfide, thiourea and isothiazolone as additives, samples were manufactured. Then, (1) surface roughness, (2) the height of nodule and (3) waviness as indices of the smoothness were measured to check the effects therefrom.

(1) Measurement of Surface Roughness

Samples were manufactured, including these additives whose additive amounts were changed by 0.25 ppm in the range of 0 ppm to 1.5 ppm. Then, similarly to Embodiment 1, surface roughness of the electroless NiP plating films of these samples was measured using an atomic force microscope (AFM) manufactured by Veeco corp. (the roughness is represented as average roughness Ra of 10 µm square). The following Table 2 shows measurement results of the surface roughness of these samples, and FIG. 3 is a graph representing the result of Table 2.

TABLE 2

| Additive amount (ppm) | Dipyridyl disulfide (nm) | Thiourea (nm) | Isothiazolone (nm) |
| --- | --- | --- | --- |
| 0.00 | 14.9 | 13.80 | 14.11 |
| 0.25 | 9.10 | 7.22 | 6.58 |
| 0.50 | 6.50 | 6.77 | 3.44 |
| 0.75 | 3.02 | 3.94 | 3.38 |
| 1.00 | 2.56 | 3.72 | 3.41 |
| 1.25 | 2.55 | 3.90 | — |
| 1.50 | 2.87 | — | 3.26 |

Figure 3:
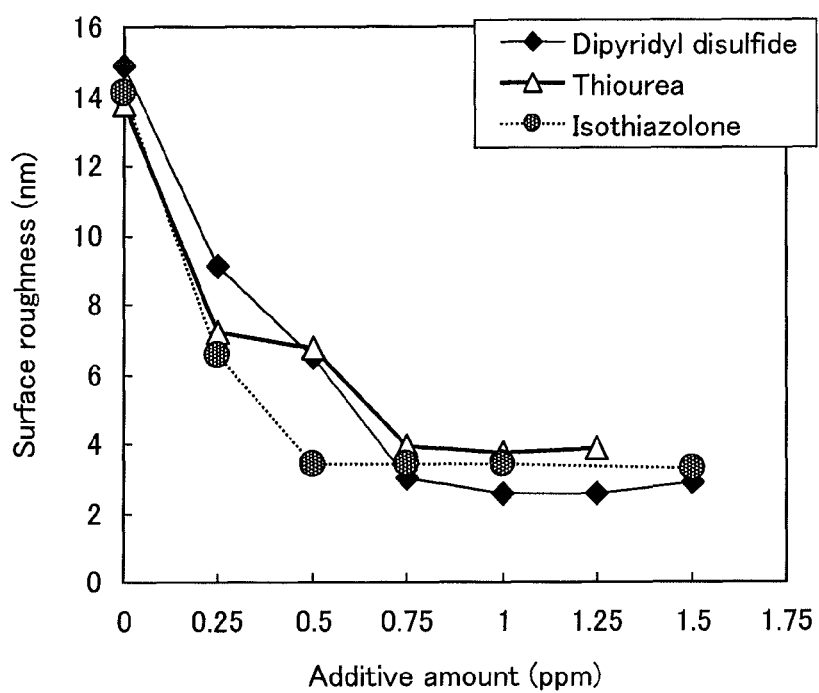
FIG. 3 shows a measurement result of surface roughness of Example 3.

As shown in Table 2 and FIG. 3, it is found that compared with the sample not including an organic sulfur compound (additive amount=0.00 ppm), the samples including organic sulfur compounds added thereto (0.25 ppm to 1.50 ppm), e.g., in the case of thiourea, the surface roughness was decreased up to about ⅓.

(2) The Height of Nodule

As Examples, a sample including 1.0 ppm of dipyridyl disulfide added thereto, a sample including 0.75 ppm of thiourea added thereto and a sample including 0.5 ppm of isothiazolone added thereto were manufactured. Then, the height of nodule and the diameter of nodule thereof were measured using an ultra-depth shape measurement microscope (produced by Keyence Corp., VK-851). As Comparative Example, the height of nodule and the diameter of nodule of the above-mentioned Comparative Example 1 were measured.

Figure 4:
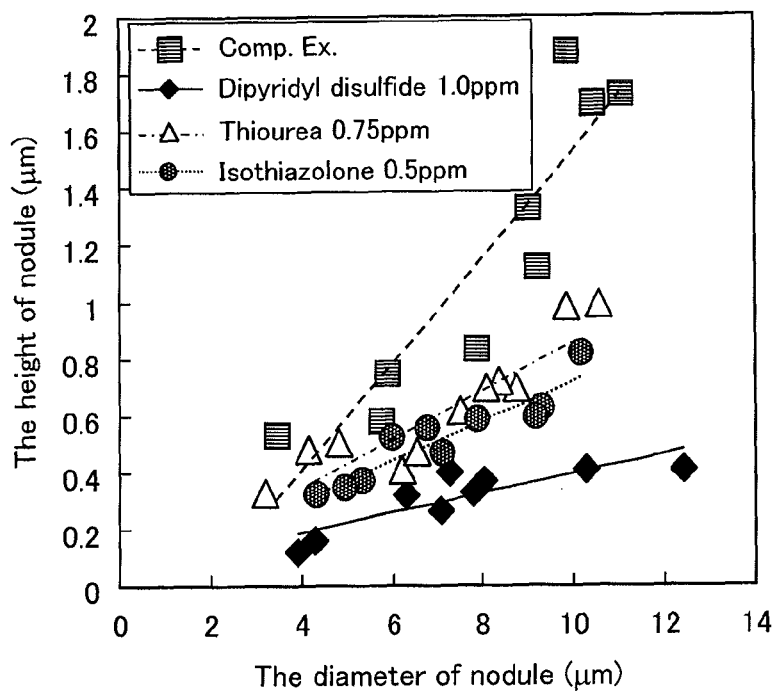
FIG. 4 shows a measurement result of the diameter of nodule and the height of nodule of Example 3.

The following Table 3 shows measurement results of the height of nodule and the diameter of nodule of these Examples and Comparative Example, and FIG. 4 shows a relationship among the measurement results.

TABLE 3

| Comp. Ex. | | Dipyridyl disulfide 1.0 ppm | | Thiourea 0.75 ppm | | Isothiazolone 0.5 ppm | |
| --- | --- | --- | --- | --- | --- | --- | --- |
| Height (µm) | Diameter (µm) | Height (µm) | Diameter (µm) | Height (µm) | Diameter (µm) | Height (µm) | Diameter (µm) |
| 3.46 | 0.53 | 7.81 | 0.33 | 9.83 | 0.98 | 6.01 | 0.52 |
| 11.05 | 1.73 | 7.28 | 0.4 | 10.55 | 0.99 | 7.87 | 0.58 |
| 5.86 | 0.75 | 7.09 | 0.26 | 8.76 | 0.69 | 7.11 | 0.46 |
| 5.74 | 0.58 | 8.03 | 0.37 | 8.34 | 0.72 | 9.34 | 0.62 |
| 10.42 | 1.7 | 4.3 | 0.16 | 6.22 | 0.41 | 9.17 | 0.59 |
| 9.84 | 1.88 | 6.31 | 0.32 | 7.48 | 0.61 | 5.33 | 0.37 |
| 7.82 | 0.84 | 12.44 | 0.41 | 8.06 | 0.69 | 4.36 | 0.32 |
| 9.16 | 1.12 | 10.26 | 0.41 | 6.54 | 0.47 | 10.18 | 0.81 |
| 9 | 1.33 | 3.9 | 0.12 | 3.22 | 0.33 | 4.98 | 0.34 |
| | | | | 4.83 | 0.5 | 6.77 | 0.55 |
| | | | | 4.16 | 0.48 | | |

As shown in FIG. 4, it can be found that compared with Comparative Example not including an organic sulfur compound added thereto, Examples including organic sulfur compounds added thereto had reduced the height of nodule with reference to the diameter of nodule.

(3) Measurement of Waviness

Samples were manufactured, including the additives whose additive amounts were changed by 0.25 ppm in the range of 0 ppm to 1.5 ppm. Then, using a flatness measurement device (produced by KLA-Tencor Corp., Opti flat), waviness (Wa) at the wavelength 5 mm were measured on the surfaces of the samples. Waviness (Wa) were obtained by calculation of an average absolute value of the height (Z) at the wavelength of 5 mm or more, which was calculated based on arithmetic average waviness (Wa) specified in JISB0601. The following Table 4 shows a measurement result of the surface waviness versus the additive amounts in the samples, and FIG. 5 is a graph representing the result of Table 4.

TABLE 4

| Additive amount (ppm) | Dipyridyl disulfide (nm) | Thiourea (nm) | Isothiazolone (nm) |
| --- | --- | --- | --- |
| 0.00 | 1.53 | 1.56 | 1.51 |
| 0.25 | 1.46 | 1.45 | 1.41 |
| 0.50 | 1.36 | 1.46 | 1.46 |
| 0.75 | 1.38 | 1.5 | 1.39 |
| 1.00 | 1.37 | 1.42 | 1.38 |
| 1.25 | 1.35 | 1.47 | — |
| 1.50 | 1.38 | — | 1.41 |

Figure 5:
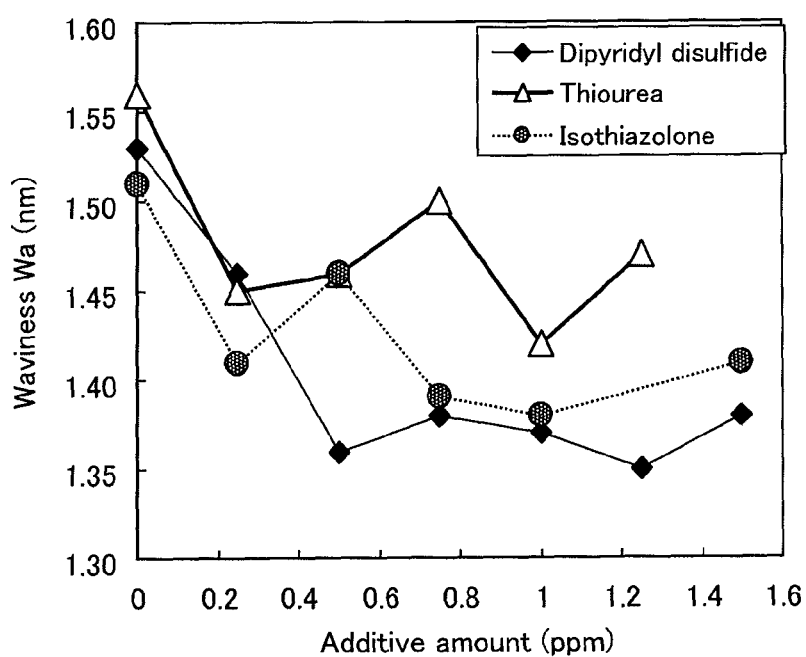
FIG. 5 shows a measurement result of waviness of Example 3.

As shown in Table 4 and FIG. 5, it is found that compared with the sample not including an organic sulfur compound (additive amount=0.00 ppm), the samples including organic sulfur compounds added thereto (0.25 ppm to 1.50 ppm) had reduced degree of waviness and smoother surfaces could be obtained.

As stated above, it was found that the samples including organic sulfur compounds containing nitrogen had better smoothing effects than the samples not including an organic sulfur compound added thereto for all of the indices including (1) surface roughness, (2) the height of nodule and (3) waviness. Thereby, it can be considered that burden on the polishing step can be reduced and the productivity of hard disk substrates can be improved.

That is the detailed description of embodiments of the present invention. Note here that the present invention is not limited to the above-described embodiments, and may include various modification examples without departing from the spirit of the present invention recited in claims. For instance, the embodiments are described above in detail for explanatory convenience and the present invention is not always limited to the entire configuration described above. A part of one embodiment may be replaced with the configuration of another embodiment, or the configuration of one embodiment may be added to the configuration of another embodiment. In the configuration of each embodiment in part, other configurations may be added, deleted or replaced.

The invention claimed is:

1. A method for the production of a hard disk substrate including an electroless NiP plating film, comprising the steps of:
   a first plating step of immersing a hard disk substrate into a first electroless NiP plating bath containing an additive having a smoothing effect to form a lower layer of the electroless NiP plating film on a surface of the substrate, the lower layer having an average surface roughness smaller than an average surface roughness of the surface, wherein the additive includes an organic sulfur compound; and
   a second plating step of immersing the substrate on which the lower layer of the electroless NiP plating film is formed in the first plating step into a second electroless NiP plating bath to directly form an upper layer of the electroless NiP plating film on the lower layer, the upper layer having corrosion resistance against an acid solution.

2. The method for the production of a hard disk substrate according to claim 1, wherein the organic sulfur compound includes nitrogen.

3. The method for the production of a hard disk substrate according to claim 2, wherein the second electroless NiP plating bath does not include an organic sulfur compound.

4. The method for the production of a hard disk substrate according to claim 1, wherein the organic sulfur compound includes at least one of thiourea, sodium thiosulfate, sulfonate, an isothiazolone compound, sodium lauryl sulfate, 2,2'-dipyridyl disulfide, 2,2'-dithiodibenzoic acid or bisdisulfide.

5. The method for the production of a hard disk substrate according to claim 1, wherein the amount of the organic sulfur compound contained in the first electroless NiP plating bath is between about 0.01 ppm and about 20 ppm.

6. The method for the production of a hard disk substrate according to claim 1, wherein the amount of the organic sulfur compound contained in the first electroless NiP plating bath is between about 0.1 ppm and about 5 ppm.

7. A hard disk substrate produced by the method according to claim 1.

8. The method for the production of a hard disk substrate according to claim 1, wherein the second electroless NiP plating bath does not include an organic sulfur compound.

* * * * *